(12) United States Patent
Cosijns et al.

(10) Patent No.: US 10,717,671 B2
(45) Date of Patent: Jul. 21, 2020

(54) GLASS SUBSTRATE WITH INCREASED WEATHERING AND CHEMICAL RESISTANCE

(71) Applicant: AGC GLASS EUROPE, Louvain-la-Neuve (BE)

(72) Inventors: Bruno Cosijns, Dworp (BE); Eric Tixhon, Crisnee (BE); Ingrid Marenne, Forville (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 171 days.

(21) Appl. No.: 15/742,296

(22) PCT Filed: Jul. 1, 2016

(86) PCT No.: PCT/EP2016/065469
§ 371 (c)(1),
(2) Date: Jan. 5, 2018

(87) PCT Pub. No.: WO2017/005621
PCT Pub. Date: Jan. 12, 2017

(65) Prior Publication Data
US 2018/0194674 A1    Jul. 12, 2018

(30) Foreign Application Priority Data
Jul. 7, 2015  (EP) ..................... 15175711

(51) Int. Cl.
| | | |
|---|---|---|
| *B32B 15/04* | (2006.01) | |
| *B32B 17/06* | (2006.01) | |
| *C03C 17/22* | (2006.01) | |
| *C03C 17/245* | (2006.01) | |
| *C03C 17/34* | (2006.01) | |

(52) U.S. Cl.
CPC ............ *C03C 17/22* (2013.01); *C03C 17/245* (2013.01); *C03C 17/34* (2013.01); *C03C 2217/213* (2013.01); *C03C 2217/24* (2013.01); *C03C 2217/282* (2013.01); *C03C 2217/29* (2013.01); *C03C 2217/76* (2013.01); *C03C 2217/78* (2013.01); *C03C 2218/152* (2013.01); *C03C 2218/153* (2013.01); *C03C 2218/1525* (2013.01); *C03C 2218/32* (2013.01)

(58) Field of Classification Search
USPC ........ 428/688, 701, 702, 697, 426, 428, 432
See application file for complete search history.

(56) References Cited

U.S. PATENT DOCUMENTS

| | | | | |
|---|---|---|---|---|
| 6,106,892 A | * | 8/2000 | Ye ........................ | C03C 17/245 427/109 |
| 6,114,043 A | * | 9/2000 | Joret ..................... | C03C 17/225 428/428 |
| 6,818,309 B1 | * | 11/2004 | Talpaert ................. | C03C 17/22 428/432 |
| 2004/0209757 A1 | * | 10/2004 | Landa ..................... | C03C 3/095 501/64 |
| 2004/0240820 A1 | | 12/2004 | Johnson et al. | |
| 2005/0153072 A1 | * | 7/2005 | Otani ...................... | C03C 17/22 427/248.1 |
| 2006/0014027 A1 | * | 1/2006 | Oudard ................... | C03C 17/22 428/428 |
| 2008/0090039 A1 | | 4/2008 | Klein et al. | |
| 2010/0255225 A1 | | 10/2010 | Cording et al. | |
| 2011/0305874 A1 | * | 12/2011 | Thoumazet ............. | C03C 17/42 428/172 |
| 2013/0025672 A1 | | 1/2013 | Auvray et al. | |
| 2013/0112264 A1 | | 5/2013 | Wang et al. | |
| 2014/0315027 A1 | * | 10/2014 | Thoumazet ............. | C03C 17/42 428/428 |
| 2014/0349107 A1 | * | 11/2014 | Thoumazet ......... | C03C 17/3441 428/336 |

FOREIGN PATENT DOCUMENTS

| | | |
|---|---|---|
| EP | 0 441 705 A1 | 8/1991 |
| EP | 1 911 794 A1 | 4/2008 |
| GB | 2 355 273 A | 4/2001 |
| JP | 2005-29464 A | 2/2005 |
| WO | WO 2010/079299 A1 | 7/2010 |
| WO | WO 2010/107998 A1 | 9/2010 |
| WO | WO 2011/101572 A1 | 8/2011 |
| WO | WO 2014/15657 A1 | 10/2014 |

OTHER PUBLICATIONS

International Search Report and Written Opinion dated Sep. 16, 2016 in PCT/EP2016/065469, 19 pages.
Extended European Search Report dated Feb. 16, 2016 in European Patent Application No. 15175711.9, 15 pages.
M.N. Saarniheimo, et al., "Undercoat Process for Fluorine-Doped Tin Oxide Type Transparent Conductive Oxide Coating", Thin Solid Films, XP055247345, vol. 532, Apr. 1, 2013, pp. 31-35.

* cited by examiner

*Primary Examiner* — Lauren R Colgan
(74) *Attorney, Agent, or Firm* — Oblon, McClelland, Maier & Neustadt, L.L.P.

(57) ABSTRACT

The invention relates in an embodiment to a glass substrate with increased weathering and chemical resistance where a surface bears a SiOxCy coating wherein the O/Si atomic ratio is comprised between 1.75 and 1.95 and the SiOxCy coating thickness is comprised between 10 nm and 80 nm. Other embodiments relate to glazings having a glass substrate where a surface bears a SiOxCy coating wherein the O/Si atomic ratio is comprised between 1.2 and 1.95 and the SiOxCy coating thickness is comprised between 10 nm and 80 nm.

22 Claims, No Drawings

GLASS SUBSTRATE WITH INCREASED WEATHERING AND CHEMICAL RESISTANCE

This invention relates to glass products that are useful in any application where the glass surface is submitted to weathering and/or chemical strain and in particular when the edge of the glass is visible. The applications comprise for example furniture applications such as table tops or shelving, in particular garden furniture, structural applications such as balustrades and partition walls, and also certain windows, glass doors, shower walls and shower doors. This invention relates in particular to glass products submitted to high humidity environments such as bathrooms, swimming pools and greenhouses for example. In all these applications it is usually desired for the glass transmission and reflection to be as color neutral as possible. This is true not only for the surfaces of the glass sheets, but also for their edges.

Regular clear soda-lime glass has suitable optical properties concerning the level and color of transmitted light. However, because of the elongated view path, a greenish tint can be observed by the naked eye on the edge of the glass. This color becomes more pronounced as the glass sheet becomes bigger.

It is known that reducing the iron oxide content of soda-lime glass yields glass sheets that are highly transparent with a bright, often slightly bluish edge color. In these so-called extra-clear glass substrates the iron content is very low with less than 0.04 percent by weight of iron oxide (expressed as Fe2O3), preferably less than 0.02 percent by weight and a redox ratio, measured as the ratio of iron in the ferrous state (expressed as FeO) to the total amount of iron (expressed as Fe2O3) of more than 0.4.

Although esthetically acceptable or even pleasing, these regular clear and also extra-clear soda-lime glass sheets do not present the degree of chemical resistance that is necessary for outdoor applications or applications in environments where humidity is high, especially in conjunction with temperature above normal room temperature and also where frequent cleaning with sometimes aggressive chemicals is necessary. Such very demanding chemical strain conditions can for example be found in swimming pools and bathrooms where glass is used for doors and enclosures, in particular for shower enclosures and shower doors. As a result these glass-sheets are attacked and show so-called glass corrosion or irisation.

It is known that diamond-like coatings (DLC) can be used to increase the chemical resistance of soda-lime glass. However, these coatings are light absorbing to such a degree, that both regular clear and extra-clear soda-lime glass sheets covered by these coatings present less suitable optical properties concerning the color of transmitted light and also present an unpleasant yellow or brown edge color.

Magnetron sputtered aluminum doped silica coatings have also been used to improve the chemical resistance of soda-lime glass. When they are deposited at near room temperature, the resulting glass sheets show a yellow edge color. A pleasant bright, slightly bluish edge color can be obtained but it requires subsequent heat treatment of the coated glass sheets and they can therefore not be used without heat treatment. Furthermore, in order to reach the required resistance, coating thicknesses of about 100 nm at least are necessary. In magnetron sputtering deposition, silica is known to have low deposition rates. Therefore these coatings are expensive to produce.

Coating deposition by chemical vapor deposition (CVD) is known to be cost-efficient in particular when used directly on a float line on a large scale. Silica (SiO2) based coatings can be deposited by CVD with very high yields starting from silane-based precursors. The reactivity of these precursors however is so high that they often react largely before reaching the surface to be coated. This then leads to powder formation in the gas phase which causes clogging of the coating apparatus as well as defects in the substrate's coating. This is especially prone to happen when $SiO_2$ based coatings are deposited using a mixture of monosilane $SiH_4$ and a strong oxidizer such as oxygen.

In view of the above, it can be seen that there exists a need in the art to provide coatings for glass sheets that increase the chemical resistance of soda-lime glass to weathering and chemical strain, while preferably maintaining suitably neutral optical properties concerning the color of transmitted light and even more preferably also avoiding yellow coloring of the glass edges of the resulting coated glass sheet.

SUMMARY OF THE INVENTION

In the present invention, the following conventions are used:

The luminous transmission (LT) is the percentage of incident luminous flux, of Illuminant D65/2°, transmitted by the glazing.

The luminous reflection (LR) is the percentage of incident luminous flux, of Illuminant D65/2°, reflected by the glazing. It can be measured on coating side (LRc) or substrate side (LRg).

CIELAB 1976 values (L*a*b*) are used to define colors for transmission, reflectance on coating side and reflectance on substrate side. They are measured with Illuminant D65/10°.

colors in transmittance are the more neutral the closer a* and b* are to 0. They are considered to be suitably neutral when $-2 \leq a^* \leq 0$ and $0 \leq b^* \leq 2$ When values are said to be "comprised between a and b", they may also be equal to a or b.

In an embodiment of this invention, a coating for glass substrates is provided that increases the chemical resistance of the glass to weathering and chemical strain, while at the same time maintaining suitably neutral optical properties concerning the color of transmitted light.

In another embodiment of the invention, a coating is provided for glass substrates that increases the chemical resistance of the glass while at the same time maintaining suitably neutral optical properties concerning the color of transmitted light and avoiding an unpleasant high level of yellow edge color.

In another embodiment of the invention, there is provided a coated glass substrate that has higher chemical resistance than uncoated glass on its coated side and maintaining suitably neutral optical properties concerning the color of transmitted light and that does not have an unpleasant high level of yellow edge color.

In another embodiment the invention, there is provided a method for chemically protecting a glass substrate that can maintain neutral optical properties concerning the color of transmitted light and that also can avoid the appearance of an unpleasant high level of yellow edge color.

DETAILED DESCRIPTION OF THE INVENTION

The present invention concerns a silicon oxy-carbide $SiO_xC_y$ coating for glass wherein the atomic ratio O/Si is comprised between 1.75 and 1.95 and the thickness is comprised between 10 nm and 80 nm, preferably between 10 nm and 50 nm, more preferably between 10 nm and 30 nm. It has been surprisingly found that these $SiO_xC_y$ coatings, without being hydrophilic, not only significantly increase the resistance to weathering and chemical strain of glass sheets, in particular of soda lime glass sheets, but also provide coated normal clear and extra-clear glass substrates with particularly neutral optical properties concerning the color of transmitted light with $-1.5 \leq a^* \leq 0$ and $0 \leq b^* \leq 1.2$.

Hereinafter $\ln(x)$ denotes the natural logarithm of the value x.

In a preferred embodiment of the invention, the color of transmitted light is such that $-1.5 \leq a^* \leq 0$ and $b^* \leq [1.40+0.30 \times \ln(0.02-a^*)]$. It has surprisingly been found that normal clear and extra clear soda-lime glass sheets thus covered have at most only a barely perceptible level of yellow edge color, as observed by the naked eye under an artificial sky as defined in standard EN1096-1:2012 on 10 cm×10 cm samples.

In a most preferred embodiment of the invention, a silicon oxy-carbide $SiO_xC_y$ coating for glass is provided wherein the atomic ratio O/Si is comprised between 1.85 and 1.95 and the thickness is comprised between 10 nm and 80 nm, preferably between 10 nm and 50 nm, more preferably between 10 nm and 30 nm. It has been surprisingly found that these $SiO_xC_y$ coatings, without being hydrophilic, significantly increase the resistance to weathering and chemical strain of glass sheets, in particular of soda lime glass sheets, but also provide coated normal clear and extra-clear glass substrates with most neutral optical properties concerning the color of transmitted light with $-1.5 \leq a^* \leq 0$ and $0 \leq b^* \leq 0.8$.

In a more preferred embodiment of the invention, the color of transmitted light is such that $-1.5 \leq a^* \leq 0$ and $b^* \leq [0.90+0.20 \times \ln(0.02-a^*)]$. It has surprisingly been found that normal clear and extra clear soda-lime glass sheets thus covered have no perceptible level of yellow edge color, as observed by the naked eye under an artificial sky as defined in standard EN1096-1:2012 on 10 cm×10 cm samples.

Regarding stoichiometry, the $SiO_xC_y$ coatings of the present invention cannot be regarded as mere mixtures of $SiO_2$ and SiC. In the $SiO_xC_y$ coatings according to the present invention it was found that the average C/Si atomic ratio was comprised between 0.1 and 0.8, preferably between, 0.1 and 0.5, preferably between 0.1 and 0.3. In these coatings the C/Si atomic ratio was found to be higher close to the substrate and decreasing the further one moves away from the substrate surface.

According to the invention, the glass substrate may be any glass substrate that may be subjected to weathering and/or chemical strain. Preferably the glass substrates are colored, normal clear or extra-clear soda lime glass substrates having a thickness comprised between 2 mm and 25 mm. Uncoated soda lime glass is known to be sensitive to weathering and chemical strain and the resulting degradation becomes visible with the appearance of haze.

In certain example embodiments of the invention, the glass substrates are normal clear or extra-clear soda-lime glass sheets having a thickness comprised between 2 mm and 12 mm. Normal clear and extra-clear glass substrates have been found to be particularly prone to show unpleasant high levels of yellow edge colors when coated with certain coatings. Normal clear glass is glass having an content of iron, expressed as $Fe_2O_3$, comprised between 0.04% and 0.4% by weight. In extra-clear glass the iron content, expressed as $Fe_2O_3$, is less than 0.04% by weight, preferably less than 0.02% by weight and the redox ratio, measured as the ratio of iron in the ferrous state (expressed as FeO) to the total amount of iron (expressed as $Fe_2O_3$) is more than 0.4. Extra-clear glass is particularly advantageous as it has low visible light absorption, which leads to particularly bright edges.

In certain embodiments of the invention, the coated glass substrates are heat treated, for example annealed or tempered and/or bended. In an embodiment of the present invention the coated glass sheets present a pleasant edge color both before and after heat treatment. Typically this involves heating the coated sheet in a furnace to a temperature of at least 580° C., more preferably of at least about 600° C. and still more preferably of at least 620° C. before rapidly cooling down the glass substrate. An example heat treating furnace temperature is from 600 to 700° C. This tempering and/or bending can take place for a period of at least 4 minutes, at least 5 minutes, or more in different situations.

In an embodiment of the invention, the $SiO_xC_y$ coated glass substrate of the present invention is present on at least one of the substrate's two sides.

In an embodiment of the current invention, the $SiO_xC_y$ coating is the uppermost coating on the glass substrate.

In another embodiment of the invention, a $SiO_xC_y$ coated glass substrate is provided having an uppermost hydrophobic coating on the $SiO_xC_y$ coating, the resulting water contact angle is at least 100°. Preferably the hydrophobic coating is in located directly on and in contact with the $SiO_xC_y$ coating. If the $SiO_xC_y$ coated glass substrate is a heat treated glass substrate the hydrophobic coating is preferably deposited after the heat treatment.

In an embodiment of the invention, the $SiO_xC_y$ coating is deposited directly on the glass substrate's surface. In a preferred embodiment no additional essentially inorganic coating is deposited on the $SiO_xC_y$ coating. In another preferred embodiment of the present invention the $SiO_xC_y$ coating is the only coating deposited on the $SiO_xC_y$ coated side of the glass substrate, with no additional coating deposited on the $SiO_xC_y$ coating.

In a preferred embodiment of the invention, the $SiO_xC_y$ is a coating deposited by chemical vapor deposition (CVD) with a gaseous mixture comprising a carrier gas, a silicon precursor, an oxygen source and a hydro-carbon based radical scavenger. In a preferred embodiment the $SiO_xC_y$ coating is deposited with a gaseous mixture comprising monosilane $SiH_4$ as silicon precursor, carbon dioxide $CO_2$ as oxygen source and ethylene $C_2H_4$ as radical scavenger. The carrier gas may be nitrogen and/or helium. Preferably the carrier gas is essentially comprised of nitrogen.

The present invention also concerns a glazing having at least one glass sheet wherein the glass sheet is coated on a side facing a humid environment with a silicon oxy-carbide $SiO_xC_y$ coating wherein the atomic ratio O/Si is comprised between 1.2 and 1.95, preferably comprised between 1.75 and 1.85, most preferably comprised between 1.85 and 1.95 and the thickness is comprised between 10 nm and 80 nm, preferably between 10 nm and 50 nm, more preferably between 10 nm and 30 nm. It has been surprisingly found that this glazing's coated side, without being hydrophilic, presents a significantly increased resistance to weathering and chemical strain of a humid environment, in comparison to an uncoated glass sheet, in particular if it is made of soda lime glass.

Preferably the humid environment is such that it presents at least occasionally an ambient temperature above 20° C. and presents the possibility of formation of water droplets on the substrate's coated surface through condensation and/or water sprays or splashes. In an example embodiment the humid environment is the inside atmosphere of an indoor swimming pool, a sauna, a bathroom or a greenhouse.

In a preferred embodiment of the invention, the glass sheet of the glazing is a normal clear or extra-clear glass substrate. It was found that normal clear and extra-clear glass sheets comprising this $SiO_xC_y$ coating have neutral optical properties concerning the color of transmitted light with $-1.5 \leq a^* \leq 0$ and $0 \leq b^* \leq 2$, preferably with $-1.5 \leq a^* \leq 0$ and $0 \leq b^* \leq 1.2$, more preferably with $-1.5 \leq a^* \leq 0$ and $0 \leq b^* \leq 0.8$. The inventors surprisingly found, in addition to the colors in transmission being neutral, that for $SiO_xC_y$ coated normal clear and extra-clear glass substrates according to a preferred embodiment of the invention, there exists a relationship between the colors in transmittance and the level of yellow edge color.

In a preferred embodiment of the invention, the color of transmitted light is such that $-1.5 \leq a^* \leq 0$ and $b^* \leq [2.54+0.56 \times \ln(0.02-a^*)]$, preferably such that $-1.5 \leq a^* \leq 0$ and $b^* \leq [1.40+0.30 \times \ln(0.02-a^*)]$, more preferably such that $-1.5 \leq a^* \leq 0$ and $b^* \leq [0.90+0.20 \times \ln(0.02-a^*)]$. It has surprisingly been found that normal clear and extra clear soda-lime glass sheets thus covered do not have an unpleasant high level of yellow edge color but at most only a low level of yellow edge color, as observed by the naked eye under an artificial sky as defined in standard EN1096-1:2012 on 10 cm×10 cm samples.

In another embodiment of the invention, the glazing's a $SiO_xC_y$ coated glass sheet has a hydrophobic coating on the $SiO_xC_y$ coating, the resulting water contact angle is at least 100°. Preferably the hydrophobic coating is in direct contact with the $SiO_xC_y$ coating. If the $SiO_xC_y$ coated glass substrate is a heat treated glass substrate, the hydrophobic coating is preferably deposited after the heat treatment.

In an embodiment of the invention, the glazing's $SiO_xC_y$ coated glass sheet has the $SiO_xC_y$ coating deposited directly on the glass substrate's surface. In another preferred embodiment no additional essentially inorganic coating is deposited on the $SiO_xC_y$ coating. In another preferred embodiment of the invention, the $SiO_xC_y$ coating is the only coating deposited on the $SiO_xC_y$ coated side of the glass substrate, with no additional coating deposited on the $SiO_xC_y$ coating.

The present invention in particular also concerns a structural glazing having at least one glass sheet wherein the glass sheet is coated on a side exposed to weathering and/or chemical strain with a silicon oxy-carbide $SiO_xC_y$ coating wherein the atomic ratio O/Si is comprised between 1.2 and 1.95 and the thickness is comprised between 10 nm and 80 nm, preferably between 10 nm and 50 nm, more preferably between 10 nm and 30 nm.

In a preferred embodiment of the invention, the glass sheet of the glazing is a normal clear or extra-clear glass substrate. It was found that normal clear and extra-clear glass sheets comprising this $SiO_xC_y$ coating have neutral optical properties concerning the color of transmitted light with $-1.5 \leq a^* \leq 0$ and $0 \leq b^* \leq 2$, preferably with $-1.5 \leq a^* \leq 0$ and $0 \leq b^* \leq 1.2$, more preferably with $-1.5 \leq a^* \leq 0$ and $0 \leq b^* \leq 0.8$. The inventors surprisingly found, in addition to the colors in transmission being neutral, that for $SiO_xC_y$ coated normal clear and extra-clear glass substrates according to a preferred embodiment of present invention there exists a relationship between the colors in transmittance and the level of yellow edge color.

In a preferred embodiment of the invention, at least one edge of the structural glazing is visible.

In a preferred embodiment of the invention, the color of transmitted light is such that $-1.5 \leq a^* \leq 0$ and $b^* \leq [2.54+0.56 \times \ln(0.02-a^*)]$, preferably such that $-1.5 \leq a^* \leq 0$ and $b^* \leq [1.40+0.30 \times \ln(0.02-a^*)]$, more preferably such that $-1.5 \leq a^* \leq 0$ and $b^* \leq [0.90+0.20 \times \ln(0.02-a^*)]$. It has surprisingly been found that normal clear and extra clear soda-lime glass sheets thus covered do not have an unpleasant high level of yellow edge color but at most only a low level of yellow edge color, as observed by the naked eye under an artificial sky as defined in standard EN1096-1:2012 on 10 cm×10 cm samples.

In another particular embodiment of the invention, the structural glazing is a laminated and/or heat treated structural glazing.

In a particular embodiment of the invention, the structural glazing is a laminated glazing element having two glass sheets exposed to weathering and/or chemical strain that are both coated on their side exposed to weathering and/or chemical strain with a $SiO_xC_y$ coating according to the present invention. In an example embodiment the structural glazing is a floor element, a partition wall, a façade element or a balustrade.

The invention also concerns a process for obtaining a glass substrate with increased chemical resistance with neutral colors in transmittance and reflectance comprising providing a glass substrate, coating the glass substrate by chemical vapor deposition (CVD) with a gaseous mixture comprising a carrier gas, a silicon precursor, an oxygen source and a hydro-carbon based radical scavenger.

In an embodiment of the invention, there is provided a process for obtaining a glass substrate with increased chemical resistance with neutral colors in transmittance and reflectance and with low levels of yellow edge color, comprising providing a glass substrate, coating the glass substrate by chemical vapor deposition with a gaseous mixture comprising a carrier gas, a silicon precursor, an oxygen source and a hydro-carbon based radical scavenger.

In a preferred embodiment of the present invention, monosilane $SiH_4$ is used as silicon precursor, carbon dioxide $CO_2$ as oxygen source and ethylene $C_2H_4$ as radical scavenger. The carrier gas may be nitrogen and/or helium. Preferably the carrier gas is essentially comprised of nitrogen.

The deposition is typically performed at a glass temperature comprised between 600° C. and 750° C., preferably between 650° C. and 740° C., most preferably between 700° C. and 730° C. The deposition may also be performed at temperatures below 600° C., but at lower deposition rates. Using plasma enhanced chemical vapor deposition the deposition may be performed at a glass temperature between 20° C. and 300° C. with deposition rates similar to those at a temperature between 600° C. and 750° C. without plasma enhancement of the chemical vapor deposition process.

In an embodiment of the invention, the glass substrate is the glass ribbon of a glass production float line. The deposition may be performed after the glass has passed the tin bath enclosure, but is preferably performed within the tin bath enclosure in order to benefit from the higher glass temperatures as well as the higher cleanliness of the glass surface. Most preferably the deposition is performed in the tin bath enclosure using a coating beam as described in EP305102. However the deposition may also be performed on a glass coating line separate from the glass production line without departing from the present invention.

The gases are distributed and contacted with the glass trough a coating beam stretching across the glass ribbon. The total flow rate of the gases is comprised between 41 and 70 standard liters per minute per meter of coating beam length. The monosilane molar concentration in the total gas flow is comprised between 2 and 12 mol %, the ethylene to monosilane molar ratio is comprised between 3 and 10 and the carbon dioxide to monosilane molar ratio is comprised between 3 and 24. The remainder of the total gas flow is made up of the carrier gas nitrogen.

Preferably the total flow rate of the gases is comprised between 41 and 70 standard liters per minute per meter of coating beam length. The monosilane molar concentration in the total gas flow is comprised between 2 and 7.5 mol %, the ethylene to monosilane molar ratio is comprised between 5 and 10 and the carbon dioxide to monosilane molar ratio is comprised between 5.5 and 24. The remainder of the total gas flow is made up of the carrier gas nitrogen.

More preferably the total flow rate of the gases is comprised between 41 and 70 standard liters per minute per meter of coating beam length. The monosilane molar concentration in the total gas flow is comprised between 2 and 6 mol %, the ethylene to monosilane molar ratio is comprised between 7 and 10 and the carbon dioxide to monosilane molar ratio is comprised between 9 and 24. The remainder of the total gas flow is made up of the carrier gas nitrogen.

The deposition is preferably performed at atmospheric pressure, to keep production costs low. However it may also be performed at pressures lower than atmospheric pressure.

EXAMPLES

The glass substrates for all examples were regular clear or extra-clear soda-lime glass substrates of 4 mm or 8 mm thickness. The deposition was performed on the moving glass ribbons during their production on a float glass production line, within the tin bath enclosure at a glass temperature comprised between 700° C. and 730° C. The properties of the four different glass substrates used for the examples below are shown in table 1.

TABLE 1

Properties of glass substrates

| | | | | | | Optical properties | | | | | | |
|---|---|---|---|---|---|---|---|---|---|---|---|---|
| | substrate | | | | | Colors transmission | | Colors reflectance coated side | | Colors reflectance substrate side | | |
| ref | thickness [mm] | type | LT % | LRc % | LRg % | a* | b* | a* | b* | a* | b* | |
| A | 4 | clear | 89.6 | 8.1 | 8.0 | −0.58 | 0.62 | −0.24 | −0.80 | −0.21 | −0.69 | |
| B | 4 | clear | 89.8 | 8.0 | 8.0 | −0.96 | 0.27 | −0.45 | −0.52 | −0.45 | −0.52 | |
| C | 4 | extra-clear | 91.2 | 8.1 | 8.1 | −0.21 | 0.22 | −0.14 | −0.54 | −0.14 | −0.54 | |
| D | 8 | clear | 88.0 | 8.1 | 8.1 | −1.48 | 0.48 | −0.65 | −0.43 | −0.65 | −0.43 | |

$SiO_xC_y$ coatings were obtained using a gaseous mixture comprising monosilane $SiH_4$ as silicon precursor, carbon dioxide $CO_2$ as oxygen source, ethylene $C_2H_4$ as radical scavenger, and nitrogen as carrier gas. The gas mixtures for all the examples are shown in table 2.

Examples 1 to 8 and 10 to 14 are examples according to the present invention. Examples 9, 15 and 16 are counter-examples. Table 2 shows the deposition conditions for the $SiO_xC_y$ coatings according to the present invention as well as for the counterexamples.

TABLE 2

| example | substrate | glass speed m/min | total gas flow slm/m | $SiH_4$ % mol % | $C_2H_4/SiH_4$ mol/mol | $CO_2/SiH_4$ mol/mol |
|---|---|---|---|---|---|---|
| 1 | A | 15 | 46.5 | 9% | 4.0 | 4.8 |
| 2 | A | 15 | 46.5 | 9% | 4.0 | 4.8 |
| 3 | A | 15 | 47.6 | 9% | 4.0 | 4.8 |
| 4 | A | 15 | 45.5 | 9% | 4.0 | 4.8 |
| 5 | A | 15 | 53.9 | 8% | 4.9 | 5.7 |
| 6 | A | 15 | 47.4 | 11% | 3.4 | 4.0 |
| 7 | A | 15 | 45.7 | 7% | 5.1 | 5.9 |
| 8 | A | 15 | 63.8 | 5% | 8.7 | 10.2 |
| 9 | B | 15 | 47.4 | 11% | 3.4 | 4.0 |
| 10 | B | 15 | 46.5 | 9% | 4.0 | 4.8 |
| 11 | C | 11 | 42.0 | 5% | 8.7 | 10.2 |
| 12 | C | 11 | 59.4 | 3% | 7.1 | 22.5 |
| 13 | C | 11 | 59.4 | 3% | 7.1 | 22.5 |
| 14 | D | 7.25 | 57.3 | 2.4% | 9.5 | 16.7 |
| 15 | A | 15 | 39.1 | 11% | 3.2 | 3.8 |
| 16 | C | 11 | 29.6 | 10% | 4.0 | 4.8 |

The composition of the $SiO_xC_y$ coatings of the present examples and in particular the atomic ratios were determined using X-ray photoelectron spectroscopy (XPS). For the thickness measurement, the erosion crater depth of the XPS measurement was determined with a step profiler. Constant erosion speed was assumed throughout the eroded depth. The haze level of all examples are below 0.5%. All samples were not hydrophilic and show water contact angles similar to uncoated soda lime glass, between 35° and 45°.

Two different chemical tests and one combined mechanical and chemical test were used for evaluating the samples. After exposure to each type of test, the samples were evaluated by measuring the haze level, as described in standard ASTM D 1003-61. This standard defines the haze as the percentage of transmitted light, which, while passing through the sample, deviates from the incident beam by an angle of more than 2.5°.

In test 1, a chemical resistance test, the glass substrates are submitted to a Humid chamber test according to the procedure for exposing test specimens in condensation-water test atmospheres with constant humidity of standard ISO6270-2:2005. The test conditions of this standard have been slightly modified insofar as the duration of the test was 40 days and the temperature in the humid chamber was kept at 60° C. The uncoated side is covered with a protective film to avoid deterioration during this test.

In test 2, a chemical resistance test, samples were first immersed in an aqueous solution of NaOH of 0.1 M concentration for 24 hours at 20° C. Thereafter the samples were thoroughly rinsed with deionized water, dried and then submitted to chemical resistance test 1.

In test 3, a combined mechanical and chemical resistance test, samples were first submitted to a scrub resistance test based on standard ASTM D2486:2000 using a nylon bristle brush (total weight with accessories 400 g) with a fixed number of 1000 cycles without abrasive scrub medium. Thereafter the samples were thoroughly rinsed with deionized water, dried and then submitted to chemical resistance test 1.

A glass substrate is considered chemically resistant or resistant to weathering and chemical strain if its haze level after all three tests is not higher than 0.5%.

| Standard EN1096-2: 2012 | Result |
|---|---|
| Neutral salt spray resistance | OK |
| Abrasion resistance | OK |

Uncoated glass substrates A, B, C, and D have haze values between 2% and 40% after tests 1, 2, and 3. As can be seen in table 3, all coated glass samples have haze values below 0.5% after all three tests. The coated glass samples according to the present invention therefore show a much higher weathering and chemical resistance than uncoated glass substrates.

TABLE 4

Optical properties without heat treatment tempering

| example | LT | LRc | LRg | Colors transmission a* | Colors transmission b* | Colors reflectance coated side a* | Colors reflectance coated side b* | Colors reflectance substrate side a* | Colors reflectance substrate side b* | Level of yellow edge color |
|---|---|---|---|---|---|---|---|---|---|---|
| 1 | 86.6 | 10.8 | 10.9 | −0.47 | 1.36 | −0.86 | −2.45 | −0.81 | −2.26 | Low |
| 2 | 87.2 | 10.4 | 10.3 | −0.5 | 1.21 | −0.74 | −2.02 | −0.76 | −2.19 | Low |
| 3 | 87.0 | 10.6 | 10.5 | −0.5 | 1.42 | −0.68 | −2.74 | −0.76 | −2.76 | Low |
| 4 | 86.9 | 10.7 | 10.6 | −0.5 | 1.48 | −0.71 | −2.84 | −0.77 | −2.87 | Low |
| 5 | 87.7 | 10.0 | 9.9 | −0.51 | 1.22 | −0.6 | −2.32 | −0.63 | −2.33 | Low |
| 6 | 84.1 | 13.2 | 13.1 | −0.37 | 1.96 | −1.23 | −2.5 | −1.26 | −3.02 | Low |
| 7 | 88.7 | 9.0 | 9.0 | −0.56 | 0.96 | −0.41 | −1.76 | −0.43 | −1.75 | Barely perceptible |
| 8 | 89.8 | 8.0 | 8.0 | −0.59 | 0.55 | −0.24 | −0.56 | −0.21 | −0.58 | Not perceptible |
| 9 | 83.3 | 13.6 | 13.3 | −0.6 | 2.46 | −1.51 | −1.73 | −1.54 | −2.67 | High |
| 10 | 84.5 | 13.0 | 12.8 | −0.61 | 1.84 | −1.24 | −2.78 | −1.38 | −3.23 | Low |
| 11 | 90.4 | 8.7 | 8.7 | −0.19 | 0.48 | −0.2 | −0.83 | −0.17 | −0.96 | Not perceptible |
| 12 | 90.8 | 8.4 | 8.4 | −0.2 | 0.4 | −0.14 | −0.73 | −0.09 | −0.79 | Not perceptible |
| 13 | 90.9 | 8.3 | 8.3 | −0.2 | 0.36 | −0.1 | −0.6 | −0.08 | −0.64 | Not perceptible |
| 14 | | | | | | | | | | |
| 15 | 84.8 | 12.6 | 12.4 | −0.42 | 2.14 | −1.06 | −3.39 | −1.11 | −3.66 | High |
| 16 | 86.2 | 12.7 | 12.8 | −0.01 | 0.85 | −1.05 | −0.46 | −0.97 | −1.27 | High |

TABLE 3

Coating properties

| example | thickness [nm] | O/Si atomic ratio | test 1 Haze | test 2 Haze | Test 3 Haze |
|---|---|---|---|---|---|
| 1 | 70 | 1.3 | ≤0.5% | ≤0.5% | ≤0.5% |
| 2 | 70 | 1.3 | ≤0.5% | ≤0.5% | |
| 3 | 70 | 1.3 | ≤0.5% | | |
| 4 | 70 | 1.3 | ≤0.5% | | |
| 5 | 70 | 1.4 | ≤0.5% | | |
| 6 | 75 | 1.2 | ≤0.5% | | |
| 7 | 60 | 1.4 | ≤0.5% | | |
| 8 | 30 | 1.9 | ≤0.5% | ≤0.5% | |
| 9 | 70 | 1.3 | ≤0.5% | | |
| 10 | 70 | 1.3 | ≤0.5% | | |
| 11 | 35 | 1.9 | ≤0.5% | ≤0.5% | ≤0.5% |
| 12 | 25 | 1.97 | ≤0.5% | ≤0.5% | ≤0.5% |
| 13 | 20 | 1.97 | ≤0.5% | ≤0.5% | ≤0.5% |
| 14 | 23 | 1.94 | ≤0.5% | | |
| 15 | 65 | 1.1 | ≤0.5% | | |
| 16 | 70 | 1.3 | ≤0.5% | | |

The coating resistance was additionally tested according to standard EN1096-2 test method for durability of class A coatings and the test results fulfill all requirements of this standard.

| Standard EN1096-2: 2012 | Result |
|---|---|
| Condensation resistance | OK |
| Acid resistance | OK |

Table 4 shows that samples according to the present invention show neutral colors in transmission and in reflectance and acceptable levels of yellow edge color. Counter-examples 9, 15 and 16, which have transmission colors where $b^* > [2.54 + 0.56 \times \ln(0.02 - a^*)]$, show non-neutral colors in transmission and an unacceptably high level of yellow edge color as well as.

Samples 1 to 6, and 10 having colors in transmittance where $a^* < 0$ and $b^* \leq [2.54 + 0.56 \times \ln(0.02 - a^*)]$ show a low level of yellow edge color. The refractive index of these coatings is comprised between 1.65 and 1.75.

Sample 7 having colors in transmittance where $a^* < 0$ and $b^* \leq [1.40 + 0.30 \times \ln(0.02 - a^*)]$ shows a barely perceptible level of yellow edge color. The refractive index of these coatings is comprised between 1.55 and 1.65.

Samples 8, 11, 12, and 13 having colors in transmittance where $a^* < 0$ and $b^* \leq [0.90 + 0.20 \times \ln(0.02 - a^*)]$ show no perceptible yellow edge color. The refractive index of these coatings is comprised between 1.45 and 1.55.

The samples were also submitted to a heat treatment. Table 5 below shows the resulting optical properties. Heat treatment consisted in heating the glass substrates for a duration of 45 seconds per mm of glass thickness at 675° C.

TABLE 5

| | | | | Colors transmission | | Colors reflectance coated side | | Colors reflectance substrate side | | Level of yellow |
|---|---|---|---|---|---|---|---|---|---|---|
| example | LT % | LRc % | LRg % | a* | b* | a* | b* | a* | b* | edge color |
| 1 | 85.9 | 11.8 | 11.7 | −0.45 | 1.34 | −0.93 | −2.34 | −1.00 | −2.56 | Low |
| 2 | 86.2 | 11.6 | 11.5 | −0.47 | 1.31 | −0.90 | −2.39 | −0.97 | −2.56 | Low |
| 3 | 85.8 | 11.8 | 11.7 | −0.46 | 1.59 | −0.88 | −3.14 | −0.97 | −3.20 | Low |
| 4 | 85.7 | 11.9 | 11.8 | −0.45 | 1.66 | −0.88 | −3.35 | −0.97 | −3.38 | Low |
| 5 | 87.0 | 10.8 | 10.7 | −0.50 | 1.27 | −0.70 | −2.73 | −0.79 | −2.70 | Low |
| 6 | 83.6 | 13.9 | 13.8 | −0.34 | 1.73 | −1.30 | −2.19 | −1.36 | −2.71 | Low |
| 7 | 87.5 | 10.2 | 10.1 | −0.52 | 1.18 | −0.61 | −2.47 | −0.67 | −2.46 | Barely perceptible |
| 8 | 89.4 | 8.5 | 8.5 | −0.60 | 0.66 | −0.32 | −1.01 | −0.30 | −1.00 | Not perceptible |
| 9 | 83.9 | 13.1 | 13.0 | −0.59 | 2.42 | −1.46 | −1.92 | −1.49 | −2.72 | High |
| 10 | 85.5 | 12.1 | 12.0 | −0.63 | 1.62 | −1.14 | −2.54 | −1.26 | −2.98 | Low |
| 11 | 90.9 | 8.2 | 8.2 | −0.18 | 0.32 | −0.06 | −0.67 | −0.12 | −0.52 | Not perceptible |
| 12 | 91.3 | 8.1 | 8.0 | −0.18 | 0.24 | −0.06 | −0.52 | −0.02 | −0.59 | Not perceptible |
| 13 | 91.2 | 8.0 | 8.1 | −0.17 | 0.21 | −0.03 | −0.52 | −0.01 | −0.57 | Not perceptible |
| 14 | 87.9 | 7.9 | 7.9 | −1.47 | 0.58 | −0.66 | −0.67 | −0.58 | −0.68 | Not perceptible |
| 15 | 84.1 | 13.4 | 13.3 | −0.39 | 2.08 | −1.13 | −3.53 | −1.22 | −3.76 | High |
| 16 | 86.9 | 12.0 | 12.1 | −0.02 | 0.78 | −0.97 | −0.46 | −0.85 | −1.24 | High |

Table 5 shows that, after heat treatment, the samples according to the present invention still show neutral colors in transmission and acceptable levels of yellow edge color.

Counterexamples 9, 15 and 16, which have transmission colors where $b^* > [2.54 + 0.56 \times \ln(0.02 - a^*)]$, show non-neutral colors in transmission and/or an unacceptably high level of yellow edge color.

After heat treatment, samples 1 to 6, and 10 having colors in transmittance where $a^* < 0$ and $b^* \leq [2.54 + 0.56 \times \ln(0.02 - a^*)]$ show a low level of yellow edge color.

After heat treatment, sample 7 having colors in transmittance where $a^* < 0$ and $b^* \leq [1.40 + 0.30 \times \ln(0.02 - a^*)]$ still shows a barely perceptible level of yellow edge color.

After heat treatment, samples 8, 11, 12, 13, and 14 having colors in transmittance where $a^* < 0$ and $b^* \leq [0.90 + 0.20 \times \ln(0.02 - a^*)]$ still show no perceptible yellow edge color.

The invention claimed is:

1. A glass substrate comprising a $SiO_xC_y$ coating, wherein the O/Si atomic ratio is between 1.75 and 1.95 and an $SiO_xC_y$ coating thickness is between 10 nm and 30 nm, wherein the coating has a water contact angle of at least 100°.

2. The $SiO_xC_y$ coated glass substrate according to claim 1, wherein the O/Si atomic ratio is between 1.85 and 1.95.

3. The $SiO_xC_y$ coated glass substrate according to claim 1, wherein the C/Si atomic ratio is between 0.1 and 0.8.

4. The $SiO_xC_y$ coated glass substrate according to claim 1, wherein the $SiO_xC_y$ coating is deposited directly on the glass.

5. The $SiO_xC_y$ coated glass substrate according to claim 1, wherein the $SiO_xC_y$ coated glass substrate is heat treated.

6. The $SiO_xC_y$ coated glass substrate according to claim 1, wherein the $SiO_xC_y$ coating or a hydrophobic coating located directly on the $SiO_xC_y$ coating is an uppermost coating on the glass substrate.

7. The $SiO_xC_y$ coated glass substrate according to claim 1, wherein the $SiO_xC_y$ coating is the only coating deposited on an $SiO_xC_y$ coated side of the glass substrate.

8. The $SiO_xC_y$ coated glass substrate according to claim 1, wherein the $SiO_xC_y$ coating is deposited by chemical vapor deposition from a gaseous mixture comprising a silane precursor, an unsaturated hydro-carbon based radical scavenger, an oxygen source, and a carrier gas.

9. The $SiO_xC_y$ coated glass substrate according to claim 8, wherein the silane precursor is monosilane $SiH_4$, the unsaturated hydro-carbon based radical scavenger is ethylene $C_2H_4$, the oxygen source is carbon dioxide $CO_2$, and the carrier gas is nitrogen, helium or a mixture of both.

10. The $SiO_xC_y$ coated glass substrate according to claim 9, wherein the $SiO_xC_y$ coated glass substrate has a haze level of 0.5% or less after being subjected to each of the following Tests 1, 2, and 3, Test 1: the $SiO_xC_y$ coated glass substrate is submitted to a humid chamber test according to the procedure for exposing test specimens in condensation-water test atmospheres with constant humidity of standard ISO6270-2:2005 except that a duration of the test is 40 days and the temperature in the humid chamber is kept at 60° C.

Test 2: the $SiO_xC_y$ coated glass substrate is first immersed in an aqueous solution of NaOH of 0.1 M concentration for 24 hours at 20° C. Thereafter the $SiO_xC_y$ coated glass substrate is rinsed with deionized water, dried and then submitted to chemical resistance Test 1

Test 3: the $SiO_xC_y$ coated glass substrate is first submitted to a scrub resistance test based on standard ASTM D2486:2000 using a nylon bristle brush (total weight with accessories 400 g) with a fixed number of 1000 cycles without abrasive scrub medium and thereafter the $SiO_xC_y$ coated glass substrate is rinsed with deionized water, dried and then submitted to chemical resistance Test 1.

11. The $SiO_xC_y$ coated glass substrate according to claim 1, wherein the glass substrate is a colored, clear or extra-clear soda lime glass substrate.

12. The $SiO_xC_y$ coated glass substrate according to claim 1, wherein the glass substrate is a clear or an extra-clear soda lime glass substrate and wherein the colors in transmission a* and b* are such that $a^* < 0$ and $b^* \leq [1.40 + 0.30 \times \ln(0.02 - a^*)]$.

13. The $SiO_xC_y$ coated glass substrate according to claim 12, wherein colors in transmission are such that $a^* < 0$ and $b^* \leq [0.90 + 0.20 \times \ln(0.02 - a^*)]$.

14. The $SiO_xC_y$ coated glass substrate according to claim 1, wherein the $SiO_xC_y$ coated glass substrate has a haze level of 0.5% or less after being subjected to each of the following Tests 1, 2, and 3, Test 1: the $SiO_xC_y$ coated glass substrate is submitted to a humid chamber test according to the procedure for exposing test specimens in condensation-water test atmospheres with constant humidity of standard ISO6270-2:2005 except that a duration of the test is 40 days and the temperature in the humid chamber is kept at 60° C.

Test 2: the $SiO_xC_y$ coated glass substrate is first immersed in an aqueous solution of NaOH of 0.1 M concentration for 24 hours at 20° C. Thereafter the $SiO_xC_y$ coated glass substrate is rinsed with deionized water, dried and then submitted to chemical resistance Test 1

Test 3: the $SiO_xC_y$ coated glass substrate is first submitted to a scrub resistance test based on standard ASTM D2486:2000 using a nylon bristle brush (total weight with accessories 400 g) with a fixed number of 1000 cycles without abrasive scrub medium and thereafter the $SiO_xC_y$ coated glass substrate is rinsed with deionized water, dried and then submitted to chemical resistance Test 1.

15. A chemically resistant glazing comprising the glass substrate according to claim 1, wherein the $SiO_xC_y$ coating is on a side facing a humid environment.

16. A chemically resistant structural glazing with at least one visible edge comprising the glass substrate according to claim 1, wherein the $SiO_xC_y$ coating is on a side facing a humid environment.

17. A process for obtaining a glass substrate according to claim 1 with increased chemical and mechanical resistance with levels of yellow edge color, comprising:

a. providing a glass substrate,
b. coating the glass substrate by chemical vapor deposition with a gaseous mixture comprising monosilane $SiH_4$, carbon dioxide $CO_2$, ethylene $C_2H_4$, and nitrogen as carrier gas,
wherein a total flow rate of the gases is comprised between 41 and 70 standard liters per minute per meter of coating beam length, a $SiH_4$ molar concentration in a total gas flow is between 2 and 7.5 mol %, a $C_2H_4$ to $SiH_4$ molar ratio is between 5 and 10, and a $CO_2$ to $SiH_4$ molar ratio is between 5.5 and 24, a remainder of the total gas flow being made up of the carrier gas nitrogen.

18. The process according to claim 17, wherein the total flow rate of the gases is between 41 and 70 standard liters per minute per meter of coating beam length, the $SiH_4$ molar concentration in the total gas flow is between 2 and 6 mol %, the $C_2H_4$ to $SiH_4$ molar ratio is between 7 and 10, and the $CO_2$ to $SiH_4$ molar ratio is between 9 and 24, the remainder of the total gas flow being made up of the carrier gas nitrogen.

19. The process according to claim 17, wherein the chemical vapor deposition is performed at a glass temperature between 600° C. and 750° C.

20. The process according to claim 17, comprising, after coating the glass substrate by chemical vapor deposition, heat treating the glass substrate.

21. A glass substrate comprising a $SiO_xC_y$ coating, wherein the O/Si atomic ratio is between 1.75 and 1.95 and an $SiO_xC_y$ coating thickness is between 10 nm and 80 nm, wherein the coating has a water contact angle of at least 100°.

22. A glass substrate comprising a $SiO_xC_y$ coating, wherein the O/Si atomic ratio is between 1.75 and 1.95 and a thickness of the $SiO_xC_y$ coating is from 10 nm to 30 nm.

* * * * *